INVENTOR
Michael M. Becka

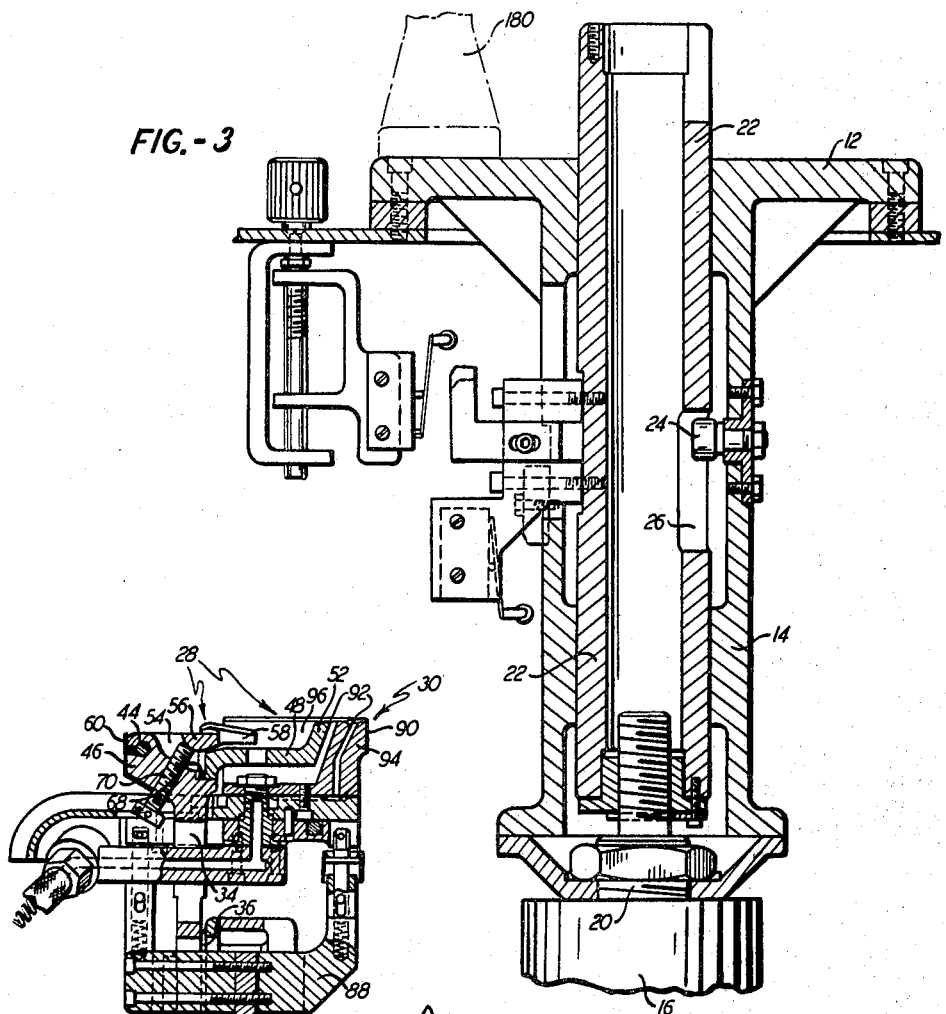

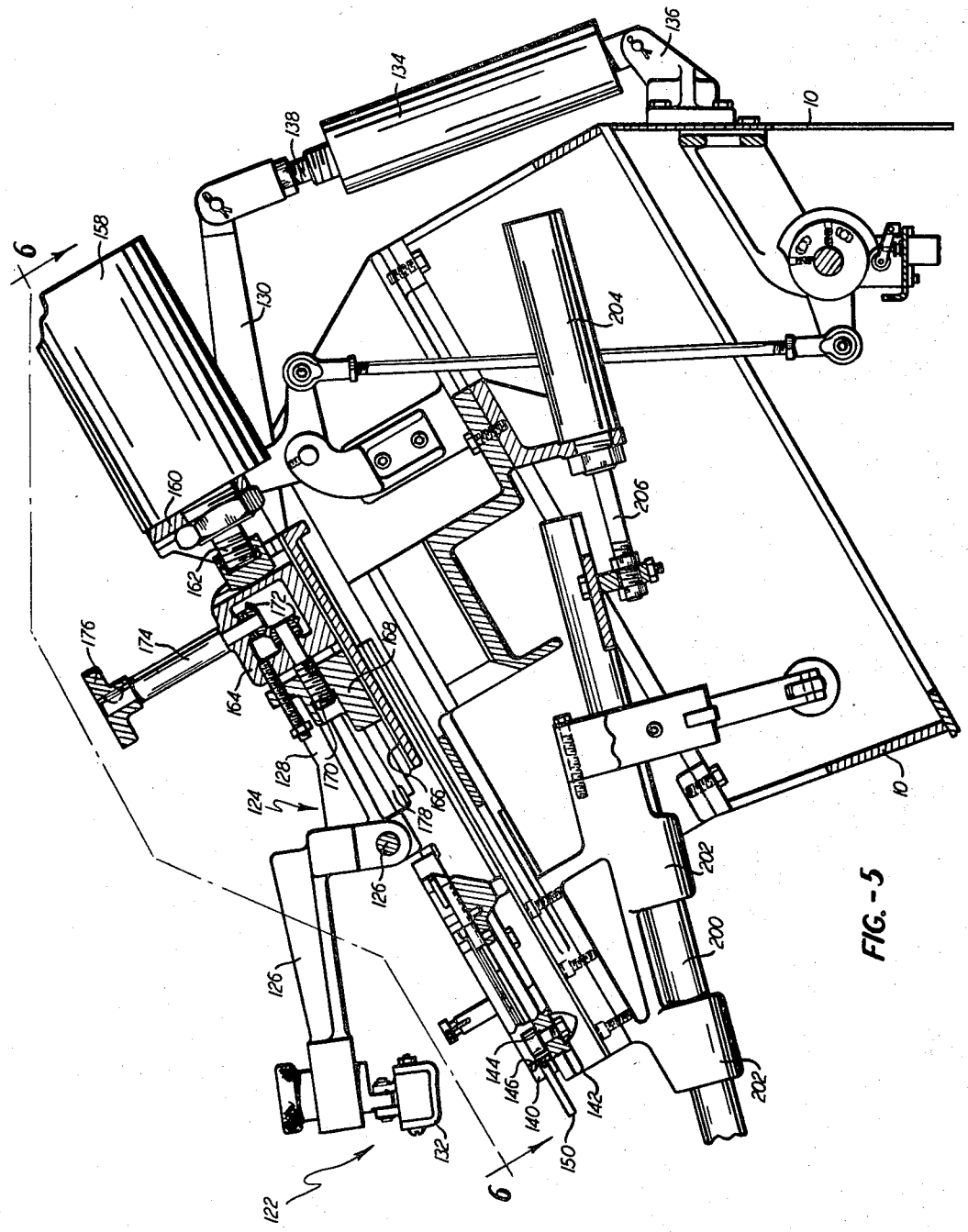

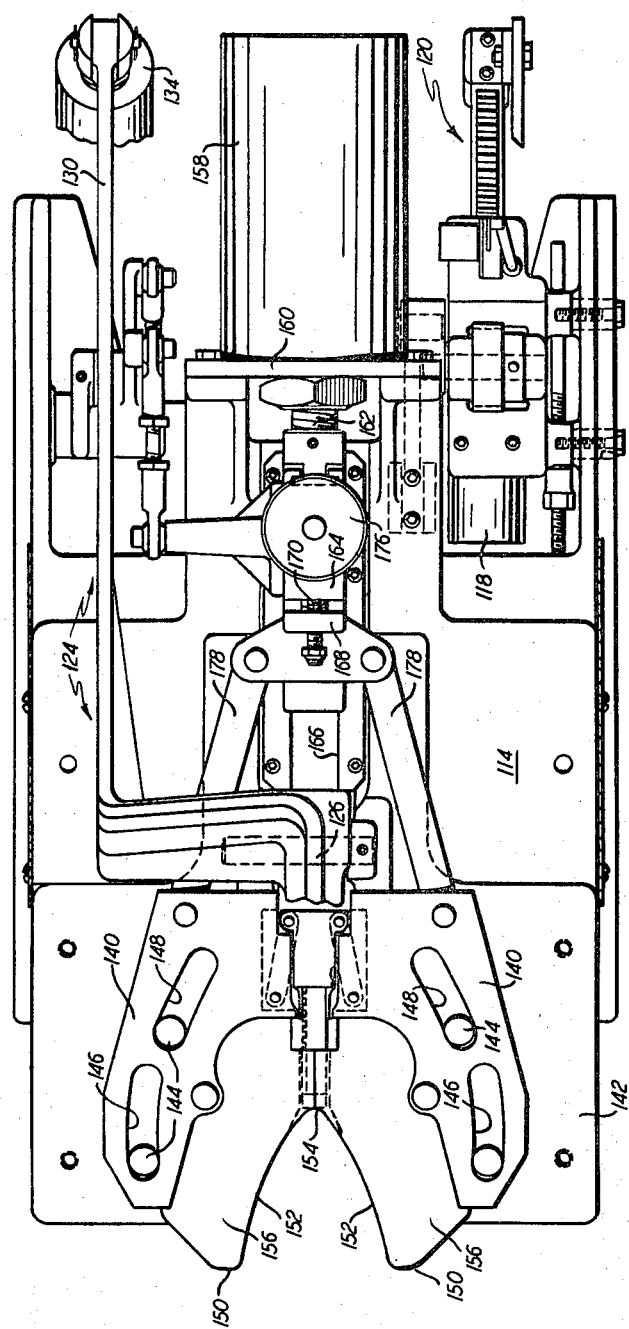

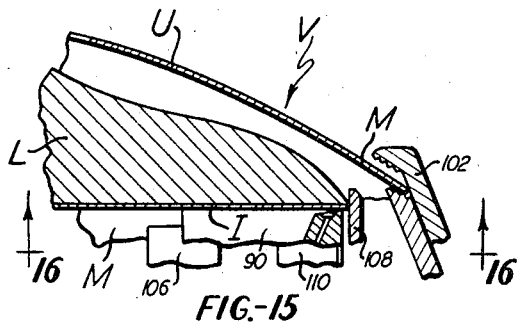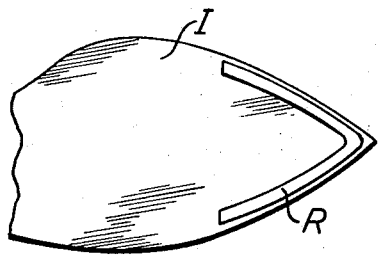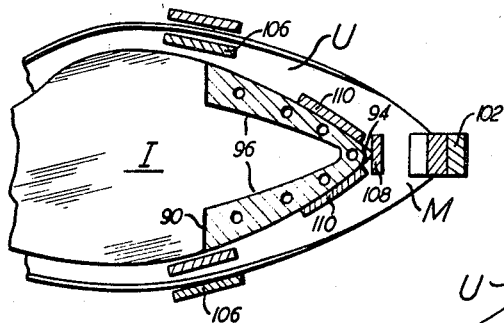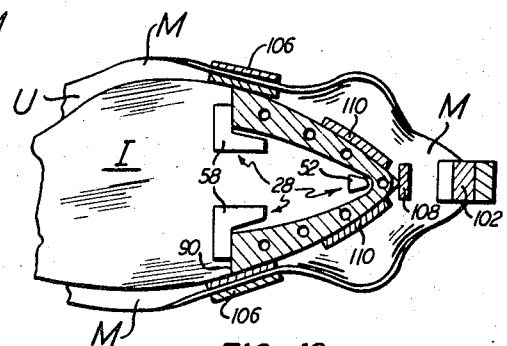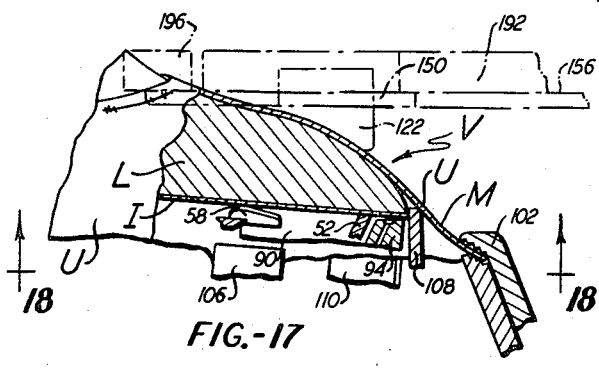

United States Patent Office 3,422,476
Patented Jan. 21, 1969

3,422,476
METHOD AND APPARATUS FOR CLAMPING AN END OF A SHOE ASSEMBLY
Michael M. Becka, Cambridge, Mass., assignor to Jacob S. Kamborian, West Newton, Mass.
Filed Apr. 19, 1967, Ser. No. 632,032
U.S. Cl. 12—145          8 Claims
Int. Cl. A43d 21/00

ABSTRACT OF THE DISCLOSURE

The disclosure is concerned with a machine for stretching a shoe upper about the toe end of the last and then wiping the upper to the toe end of an insole that is located on the last bottom by means of conventional wipers having a flat wiping surface. The machine includes a number of clamping instrumentalities adapted to clamp the shoe assembly in a predetermined configuration with respect to the wipers as well as devices for gripping and stretching the shoe upper about the last.

Summary of the invention

When presenting the toe end of an unlasted shoe assembly to a machine of the instant type having conventional wipers that are adapted to move in a planar wiping stroke the shoe assembly is preferably inclined so that the toe end of the shoe points towards the wiping plane of the wipers. This is done to insure that the extreme toe end of the shoe assembly will be properly wiped to the insole. This is especially true with shoes having relatively pointed toes that are generally more difficult to wipe at the toe. A support is provided in the machine for supporting the shoe assembly in this inclined position. Also included in the machine is a hold-down that is adapted to engage the vamp of the shoe assembly so as to press the forepart of the shoe assembly downwardly against the shoe support and later against the wiping surface of the wipers. A heel clamp is provided that is adapted to preclude heelward movement of the shoe assembly during the wiping operation. When the wiping stroke has progressed to the point where the extreme toe end of the shoe has at least been partially lasted and the wipers have crossed under the insole the support for the shoe assembly is retracted to enable the shoe assembly to be firmly pressed directly against the wiping surface of the wipers by means of the hold down. The inclined orientation of the shoe assembly tends to cause a pitching of the shoe assembly as the support thereof is transferred to the wipers, this pitching tending to cause the heel end of the shoe assembly to move downwardly and become scuffed and marred by reason of engagement with the heel clamp. The instant invention is concerned with a heel clamp, adapted to move heightwise with the heel end of the shoe assembly, so as not to so damage it, yet capable of precluding heelward movement of the shoe assembly during the wiping stroke. It is an improvement over the subject matter disclosed in pending U.S. application Ser. No. 472,525, filed July 16, 1965.

The invention will now be described in greater detail with reference to the accompanying drawings wherein:

FIGURE 3 is a vertical section of the sleeve and the toe post, movable therein, upon which the shoe assembly is ultimately supported;

FIGURE 4 is a side elevation in section, of the shoe assembly supporting members and the adhesive applicator, that are mounted to the upper end of the toe post and directly support the shoe assembly;

FIGURE 5 is a side elevation of the portion of the machine, illustrating the hold down and wiper driving mechanisms and the heel clamp operating mechanism;

FIGURE 6 is a plan view of the wiper driving mechanism taken along the line 6—6 of FIGURE 5;

FIGURE 15 is a side elevation in section of the shoe assembly, as it is initially placed on the adhesive applicator of the machine;

FIGURE 16 is a bottom view of the shoe assembly taken along the line 16—16 of FIGURE 15;

FIGURE 17 is a side elevation, partially in section, of the shoe assembly illustrating the pulling over operation with the bottom of the shoe assembly being brought to bear against the insole rest assembly;

FIGURE 18 is a bottom view of the shoe assembly taken along the line 18—18 of FIGURE 17;

FIGURE 19 is a bottom view of the insole, illustrating the configuration of the ribbon of adhesive applied thereto.

Figure 1:
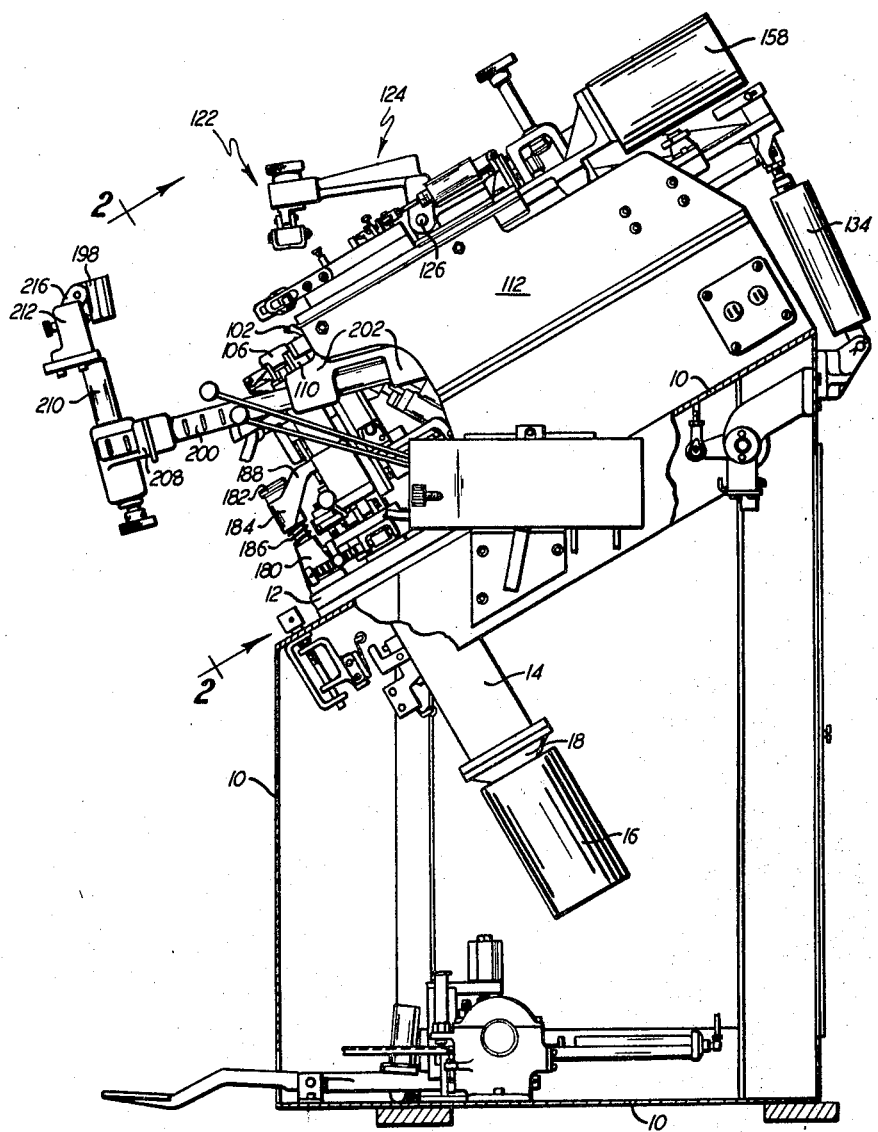
FIGURE 1 is a side elevation of the machine, in which the subject of the instant invention is incorporated.

Referring to FIGURE 1, the machine has a frame 10 and a base plate 12 formed thereon and a sleeve 14 extending downwardly from the base plate 12. For convenience of operation, the base plate 12 is inclined about 30 degrees from the horizontal. For ease of explanation, directions that parallel the plane of the base plate 12 will hereinafter be referred to as extending horizontally and directions paralleling that of the sleeve 14 will hereinafter be referred to as extending vertically. The operator is intended to be located to the left of the machine as seen in FIGURE 1 and a direction extending towards the operator (right to left in FIGURE 1) will be referred to as forward, while a direction extending away from the operator (left to right in FIGURE 1) will be referred to as rearward.

An air operated motor 16 is secured to a cap 18 at the bottom of the sleeve 14, and has a piston rod 20 extending upwardly within the sleeve 14 (see FIGURE 3). A toe post 22 is contained within the sleeve 14 for vertical sliding movement therein and is connected to the piston rod 20 of the motor 16. A roller 24, mounted to the sleeve 14 and extending inwardly thereof, is received in a vertical slot 26 in the post 22 to preclude rotation of the post about the axis of the sleeve 14. The upper end of the toe post 22 extends upwardly beyond the level of the base plate 12. A number of shoe operating instrumentalities, hereinafter described, are supported by the upwardly extending end of the toe post 22 for heightwise movement therewith.

Figure 2:
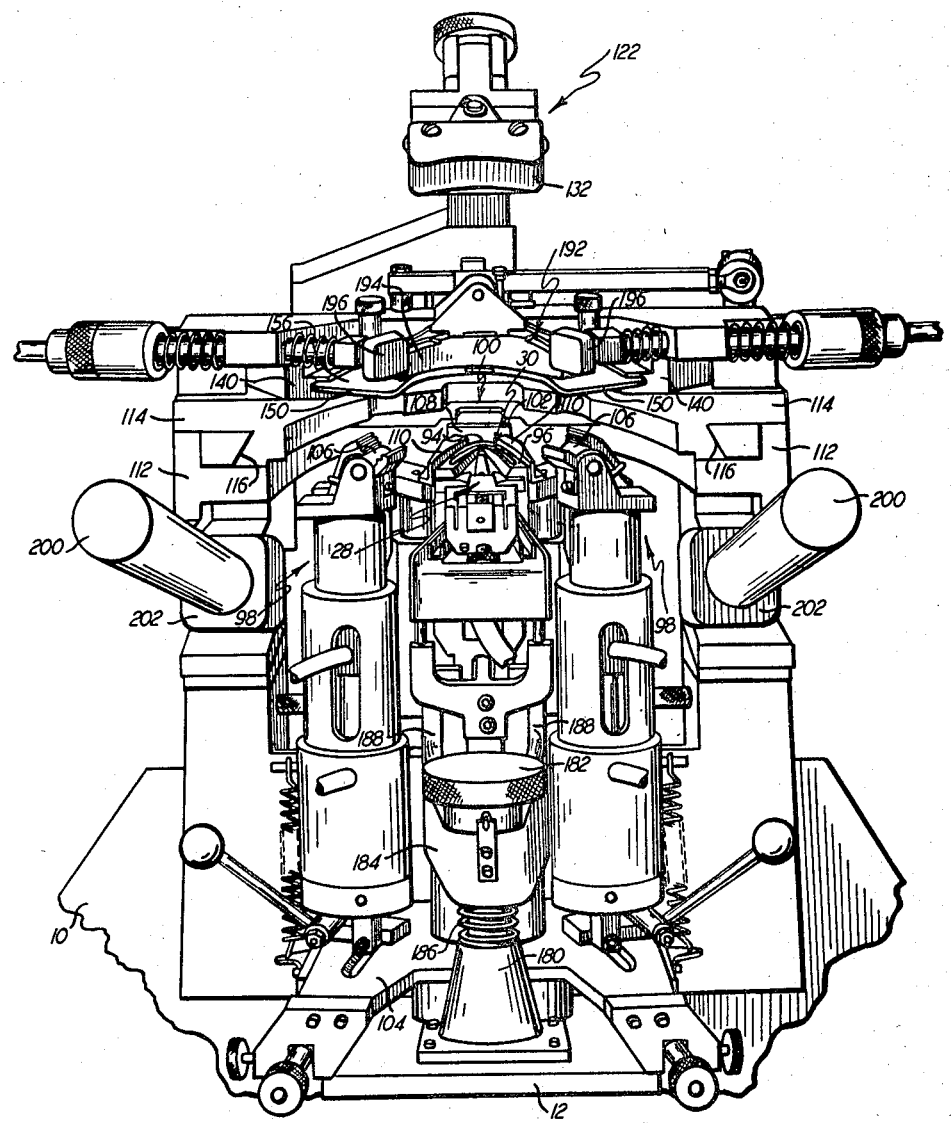
FIGURE 2 is a front elevation of the upper portion of the machine as seen from the line 2—2 of FIGURE 1.
Figure 7:
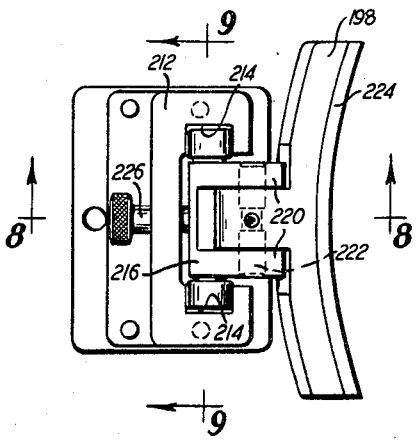
FIGURE 7 is a plan view of the heel clamp.

Referring to FIGURES 2 and 4, it may be seen that among the shoe operating instrumentalities that are supported on the toe post 22 are an insole rest assembly 28 and an adhesive applicator assembly 30. The particular construction of these shoe manufacturing instrumentalities will be described only to the extent necessary to define the operating environment of the subject of the instant invention, reference being made to the aforesaid U.S. application for a more detailed disclosure thereof. The insole rest assembly 28 and adhesive applicator assembly 30 are mounted to the toe post 22 by means of a toe post extension 32, that is secured to the upwardly extending end of the toe post 22. The insole rest assembly 30, on which the bottom forepart of the shoe assembly rests, is mounted on a bar 34, which in turn, is slidably mounted for vertical movement between a bearing plate 36 and a gibs 38, that are secured to the toe post extension 32. A nut 40, rotatably mounted to the toe post extension 32, is in threaded engagement with a screw 42, that is fastened to the bar 34, so that rotation of the nut 40 may effect vertical adjustment of the bar 34 and the insole rest assembly 28 mounted thereon, and consequently, the elevation of the shoe assembly with respect to the post 22.

Figure 11:
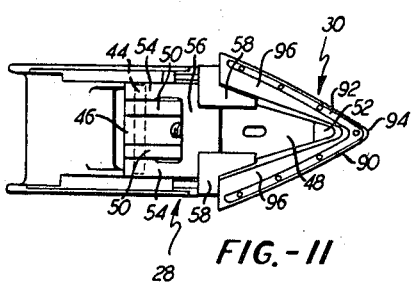
FIGURE 11 is a plan view of the insole rest assembly and adhesive applicator assembly.
Figure 10:
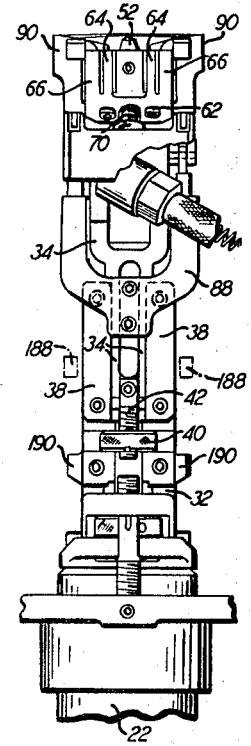
FIGURE 10 is a front elevation of the toe post extension and the insole rest assembly and adhesive applicator assembly supported thereon.

The insole rest assembly 28 is adapted to support the shoe assembly at the bottom forepart portion thereof (see FIGS. 17 and 18), and is adjustable so as to support the shoe assembly in a rearwardly pitched attitude for a purpose that will be later described in detail. As used herein, the term "rearward pitch" will refer to the direction of movement of the shoe assembly when rotated in a clockwise direction as viewed in FIGURES 12 and 17. Conversely, the terms "forward pitch" will refer to the direction of movement of the shoe assembly when rotated in a counterclockwise direction as viewed in FIGURES 12 and 17. Referring to FIGURES 4, 10, and 11, the insole rest assembly 28 includes a pivot pin 44 located at the top of the bar 34, which extends through a prong 46, at the top of the bar 34. A lug 48, extending rearwardly of the pin 44, has forwardly directed legs 50 that straddle the prong 46 and are pivoted on the pin 44. A toe insole rest 52 extends upwardly of the rear end of the lug 48, and is adapted to support the shoe assembly at the toe end of the bottom of insole thereof. A pair of legs 54 are pivoted on the pin 44 outwardly of the legs 50. A crossbeam 56, extending between the legs 54, has a pair of forepart insole rests 58 extending upwardly thereof, which are adapted to support the shoe assembly at the forepart portion thereof. A leaf spring 60, secured to the front of the top of the bar 34 by screws 62 (see FIGURE 10), has upwardly extending limbs 64 and 66 that respectively bear against the legs 50 and 54 to yieldably urge them clockwise, as seen in FIGURE 4, about the pin 44, to thereby yieldably urge the insole rests 52 and 58 downwardly. A stop ledge 68, on the bar 34, that bears against the lug 48, limits the downward movement of the insole rest 52. A stop bolt 70, threaded into the bar 34 and bearing against the crossbeam 56, limits the downward movement of the forepart insole rests 58. By operating the bolt 70, the elevation of the forepart insole rests 58 may be vertically adjusted so as to support the shoe assembly placed thereon at the desired pitch and inclination. It may be seen that operation of the bolt 70 to raise the forepart insole rests 58 will cause the shoe assembly to be pitched more rearwardly and at a greater inclination.

The adhesive applicator assembly 30 is mounted to the toe post extension 32 so as to have movement that is both unitary with and independent of the toe post 22. As illustrated in FIGURE 4, a rearwardly extending ledge 72 of the toe post extension 32 has a hanger 74 depending therefrom and an air operated motor 76 is pivoted to the hanger 74. The piston rod 78 of the motor 76 is pivoted to a link 80, and the link 80 is pivoted to a pair of toggle links 82 and 84, the toggle link 82 extending downwardly of the link 80, and being pivoted to the toe post extension 22 with the link 84 extending upwardly of the link 80, and being pivoted to a slide 86 that is guided for vertical sliding movement between the toe post extension 32 and the bearing plate 36. The adhesive applicator assembly 30 is supported on an adhesive applicator mount 88 which, in turn, is secured to and extends upward of the slide 86. The adhesive applicator assembly is mounted atop the mount 88 for yieldable and limited universal movement with respect thereto. The adhesive applicator assembly 30 includes an adhesive applicating member 90 of substantially U-shaped configuration, having a dispensing trough 92 located at its upper surface that is adapted to engage the bottom of the insole I and to distribute a ribbon of adhesive R to the marginal portion of the toe end of the bottom of the insole I (see FIGURES 4, 11 and 19). The adhesive applicator 90 has a bight 94 and a pair of legs 96 diverging forwardly from the bight 94 and embraces the insole rest assembly 28 as shown in FIGURE 11. Means fully disclosed in the aforesaid U.S. application Ser. No. 472,525, filed July 16, 1965, provide for communicating adhesive from a source thereof to the trough 92 of the adhesive applicator 90. It may thus be seen that the insole rest assembly 28 and the adhesive applicator assembly 30 may have movement that is both unitary with and independent of the toe post 22 and of each other. When in an idle position (FIGURE 4) the upper surface of the applicator 30 is biased at a higher elevation than that of the insole rest assembly 28.

Referring to FIGURE 2 it may be seen that also supported on the toe post 22 for movement in unison therewith are a pair of side pincer assemblies 98 and a toe pincer assembly 100. The toe pincer assembly 100 is mounted to the ledge 72 and extends upwardly such that the jaws 102 thereof may be disposed adjacent and rearwardly of the bight 94 of the adhesive applicator member 90. The side pincer assemblies 98 are supported about the toe post 22 by means of a platform 104 that is adjustably mounted for vertical movement on the toe post 22 between the toe post extension 32 and the base plate 12. The side pincer assemblies 98 are supported in such a manner as to extend upwardly such that the jaws 106 thereof are disposed upwardly of each leg 96 of the adhesive applicator member 90. The vertical adjustment of the side pincer assemblies 98 that are mounted thereto so as to raise or lower the jaws 106 thereof to a level such that when the shoe assembly is placed on the adhesive applicator 90, the downwardly extending margin M of the upper U thereof may extend into the open jaws 106 in readiness to be gripped thereby (see FIGURES 15 and 16).

Both the toe pincer assembly 100 and the side pincer assemblies 98 are so constructed that the jaws 102 and 106 thereof may be closed to grip a marginal portion M of the shoe upper U and subsequently move downwardly to stretch the shoe upper U about the last L. As the pincer assemblies 98 and 100 move downwardly to stretch the upper U about the last L, the shoe assembly is drawn downwardly, thus causing the adhesive applicator 90 to be urged downwardly therewith until the forepart bottom of the shoe assembly bears against the insole rest assembly 28 whereupon further downward movement of the last L and insole I is precluded (see FIGURE 17). The limited universal mounting of the applicator 90 enables it to become self-seated on the bottom of the insole I.

As more fully disclosed in the aforesaid U.S. application, a front retarder 108 is interposed between the bight 94 of the adhesive applicator 90 and the toe pincer jaws 102 and a pair of side retarders 110 are located outwardly of the legs 96 of the applicator 90. Each of the retarders 108 and 110 are yieldably urged upwardly so as to normally extend above the level of the applicator 90 (see FIGURE 15). The retarders 108 and 110 serve a multitude of purposes among which are to aid in proper initial location of the shoe assembly on the applicator 90 and to thereafter aid in the stretching of the upper U as well as to aid in temporarily maintaining the upper in a pulled-over condition when the toe and side pincers 102 and 106 are caused to release their grip on the upper U as will be described later, reference again being made to the aforesaid U.S. application for a complete description of the construction and operation thereof.

During the aforesaid shoe stretching operation the motor 16 is maintained in a deactivated condition such that the toe post 22 and the aforesaid shoe operating instrumentalities supported thereon are in a downward position. After the aforesaid shoe stretching operation has been effected, the motor 16 is actuated to cause the toe post 22 and the shoe operating instrumentalities supported thereon, together with the shoe assembly, to rise to a predetermined level later described. Referring to FIGURES 1 and 2, it may be seen that the frame 10 includes a head 112 located rearwardly of the aforementioned devices. Mounted to and about the head 112 are devices for effecting a further pulling over and stretching of the shoe upper about the last L, rigidly clamping selected portions of the shoe assembly in preparation for subsequent shoe manufacturing operations and wiping the marginal portions of the upper U to corresponding marginal portions of the insole I. These devices are supported on a slide plate 114 that is mounted for forward and rearward horizontal sliding movement on gibs 116 formed in the head 112, so as to be movable between a rearward, out-of-the-way, and a forward, working position. Referring to FIGURE 6, an air actuated motor 118 is mounted to the frame 10, and is operatively connected to the slide plate 114 by means of a rack and pinion arrangement 120, the particular construction of which is unnecessary to understanding of the instant invention, reference being made to the aforesaid U.S. application Ser. No. 472,525, filed July 16, 1965, for a full description thereof. It is sufficient to note that the motor 118 may be actuated to effect forward and rearward horizontal sliding movement of the slide plate 114 between its aforesaid rearward and forward positions.

During the rise of the pulled-over shoe assembly in response to actuation of the motor 16, a toe hold-down 122 is caused to be brought downwardly into engagement with the vamp portion V of the shoe assembly, so as to further rigidly clamp the toe end of the shoe assembly between it and the insole rest assembly 28. Referring to FIGURES 1, 5 and 6, a hold-down lever 124 is pivotally mounted to the slide plate 114 by means of the pin 126. The holddown lever 124 is pivotally mounted to the pin 126 at a point intermediate its ends, so that it has a forwardly extending portion 128 and a rearwardly extending portion 130. The toe hold-down 122, having a flexible hold-down pad 132 thereon, is secured to the forwardly extending end 126 of the lever 124. An air actuated motor 134 is pivotally mounted to a bracket 136 that is secured to the frame 10 and has a piston rod 138 that is pivoted to the rearwardly extending end 130 of the hold-down lever 124, such that upon actuation of the motor 134, the hold-down pad 132 may have substantially heightwise movement that is towards and away from the vamp V of the shoe assembly, so as to engage the shoe assembly and press it downwardly against the insole rest assembly 28.

The wiping device is similarly mounted to the slide plate 114 for unitary movement therewith between the aforesaid forward and rearward positions. Referring to FIGURES 2 and 6, a pair of symmetrically disposed wiper cams 140 are slidably supported on a thickened block 142 that forms the forward end of the slide plate 114. The block 142 has pins 144 upstanding therefrom that extend into cam slots 146 and 148 formed in each of the wiper cams 140. A pair of conventional wipers 150, having forwardly divergent edges 152 that divert from a vertex 154, are mounted to the wiper cams 140. The upper surface 156 of each of the wipers 150 is flat. The movement of the wiper cams 140 and wipers 150 mounted thereto is governed by the configuration of the pins 144 and cam slots 146 and 148 in the wiper cams 140. For purposes of disclosure of the instant invention, it is sufficient to note that the wipers 150 have components of movement that are both inwardly swinging and horizontally forward, their being no motion of the wipers 150 in a plane other than the horizontal, so that the flat upper surface 156 of each wiper 150 moves in a horizontal, planar, wiping stroke along a wiping plane P (see FIGURES 12 and 17). The wiping stroke of the wipers 150 is effected, as may be seen from FIGURES 5 and 6, by means of an air actuated motor 158 that is secured to a flange 160 at the rear of the slide plate 114. The piston rod 162 of the motor 158 is connected to a housing 164 that is slidably mounted in gibs 166 formed in the slide plate 114. A block 168 is slidably supported in the gibs 166 forwardly of the housing 164 and is connected to the housing 164 by a bolt 170 that is threaded into the block 168 and extends rearwardly therefrom into the housing 164. The bolt 170 is connected by bevel gears 172 within the housing 164 to a shaft 174 that extends upwardly and out of the housing 164, a knob 176 being secured to the upwardly extending end of the shaft 174. Forwardly diverging links 178 are pivotally connected at their rearward ends to the block 168 and at their forwards ends to the wiper cams 140. It may thus be seen that actuation of the motor 158 may cause the block 168 and the forwardly diverging links 178 to move forwardly thereby effecting the desired movement of the wiper cams 140 and wipers 150 mounted thereto.

Referring to FIGURES 1 and 2, it may be seen that the extent to which the toe post 22 and shoe asembly supported thereon may rise is determined by means of a column 180 that is secured to and extends upwardly of the base plate 104, forwardly of the post 22. A knob 182 is threaded into the column 180 and bears against a sleeve 184 that is yieldably urged upwardly against the knob 182 by a compression spring 186. A pair of lugs 188 are integral with and extend rearwardly of the sleeve 184. The vertical position of the lugs 188 may be adjusted by rotating the knob 182 to thereby lower or raise the sleeve 184 on the column 180. The lugs 188 are in vertical abutting alignment with a pair of tangs 190, extending outwardly of the toe post extension 32 (see FIGURE 10). Thus, the height to which the toe post 22 may be raised is limited by the vertical position of the lugs 188. The lugs 188 are adjusted to effect termination of the rise of the shoe assembly when the bottom of the toe end of the insole I is just above the level of the upper surface 156 of the wipers 150, so that the downwardly extending margin M of the upper U intersects the wiping plane P of the uper surface 156 of the wipers 150 (see FIGURE 12). The shoe assembly is caused to rise from a position illustrated in FIGURE 17 to the position indicated in FIGURE 12.

Figure 12:
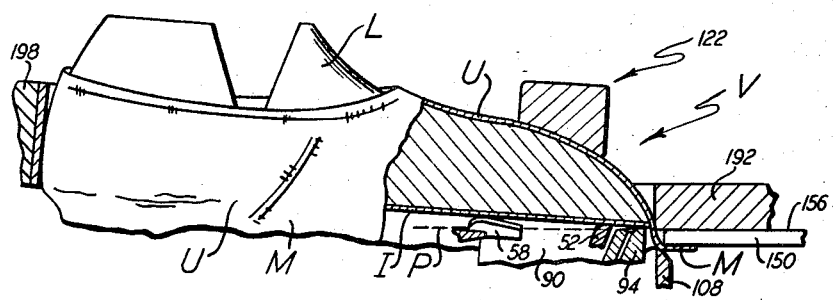
FIGURE 12 is a side elevation, partly in section, and illustrating the shoe assembly just prior to operation of the wiping means.
Figure 13:
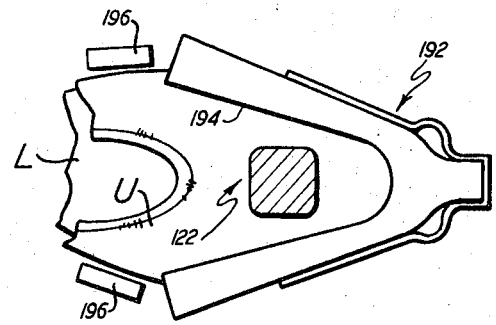
FIGURE 13 is a plan view of the shoe assembly, illustrating the manner in which the yoke overlaps the peripheral portions of the forepart of the shoe assembly.
Figure 14:
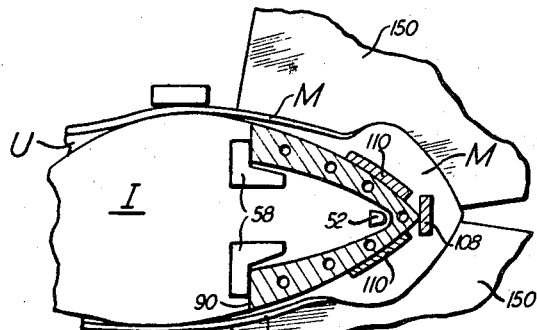
FIGURE 14 is a bottom view of the shoe assembly, just prior to actuation of the wiping means taken along the line 14—14 of FIGURE 12.

Included in the shoe operating instrumentalities that are mounted about the head 114 is a substantially U-shaped yoke 192. The yoke 192 is made of a flexible deformable material such as Teflon. The yoke 192 is located in the machine directly above the wipers 150 (see FIGURES 2, 12 and 17), and is so disposed on the slide plate 114, that when the slide plate 114 is moved to a forward, working position, the inner yoke wall 194, which serves as an upwiping member, will be above and overlapped by the periphery of the toe portion of the shoe assembly (FIGURE 13). Thus, when the motor 16 is actuated to raise the toe post 22 and the shoe assembly supported thereon, the periphery of the forepart of the shoe assembly may engage the inner wall 194 of the yoke 192, whereupon continued upward movement of the shoe assembly may cause the yoke 192 to effect an upwiping operation of the shoe assembly. A more detailed description of the operation of the yoke 192 may be found in the aforesaid U.S. application Ser. No. 581,218, filed Sept. 22, 1966. At this stage of the operation of the machine, the bearing of the hold-down 122 against the vamp V of the shoe assembly is under a relatively light pressure, which is sufficient to prevent the shoe assembly from shifting with respect to the adhesive applicator 90 and the insole rest 28 during its upward movement into the yoke. The yoke 192 is disposed at a height in the machine such that, when the shoe assembly completes its rise, the upwiping operation will have been completed just as the insole I reaches the proper height with respect to the wipers 150, as shown in FIGURE 12. When the shoe assembly has completed its rise, the yoke 192 is pressed against the shoe assembly under an increased force to aid in clamping the stretched upper in position on the last. This clamping function is further aided by bumpers 196 that are disposed adjacent the ends of the yoke 192, and are urged against the shoe assembly simultaneously with the yoke 192.

After the yoke 192 and bumpers 196 have been actuated to effect their clamping functions, the heel end of the shoe assembly is caused to be clamped. Referring to FIGURES 1, 2, 5 and 20, a heel clamp 198 is incorporated into the machine forwardly of the toe post 22, and is mounted for movement that is towards and away from the shoe assembly, so as to be engageable with the heel end thereof. The heel clamp 198 is supported by a pair of bars 200 that are slidably supported for forward-rearward movement in bosses 202 formed on the frame 10. An air motor is mounted to the machine and the piston rod 206 thereof is connected to the bars 200 to effect the aforesaid forward-rearward movement of the bars 200 and heel clamp 198 supported thereon. A crossbar 208 is connected to and spans the forward ends of the bars 200. A post 210 is slidably mounted for heightwise movement in the crossbar 208 and is provided with means for locking the post 210 in position, in a manner fully described in U.S. application Ser. No. 472,525, filed July 16, 1965. Secured to the top of the post 210 is a heel clamp mount 212 having heightwise extending guideways 214 formed therein (see FIGURES 1, 7, 8 and 9). A heel clamp carriage 216 is supported by the heel clamp mount 212, and is guided for heightwise movement therein by means of rollers 218 that are rotatably mounted to the carriage 216, and extend laterally into the heightwise extending guideways 214 of the heel clamp mount 212. The heel clamp 198 is pivotally supported at the upper end of the carriage 216 by means of a clevis 220, that is formed integrally with the carriage 216, and the pin 222. A clamping pad 224, formed from a flexible material, is secured to the rear face of the heel clamp 198.

Figure 8:
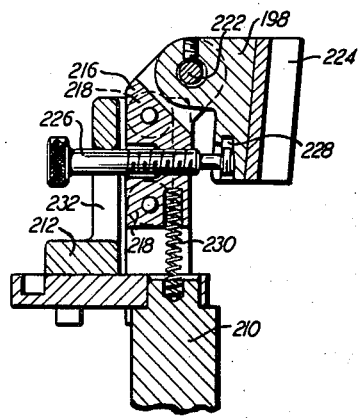
FIGURE 8 is an elevation, in section, of the heel clamp as seen along the line 8—8 of FIGURE 7.
Figure 9:
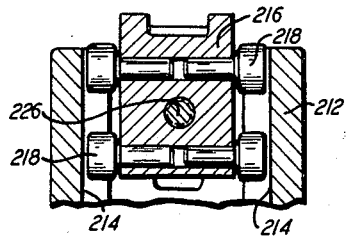
FIGURE 9 is a sectional elevation of the mounting for the heel clamp carriage, as seen along the line 9—9 of FIGURE 7.

The position of the heel clamp 198, with respect to the axis of the pin 222, may be adjusted by manipulation of a screw 226 that is threaded into the carriage 216, and is rotatably contained within a T-shaped slot 228 formed in the clamp 198. A heightwise extending compression spring 230 is interposed between the bottom of the carriage 216 and the top of the post 210 to bias the carriage 216 and heel clamp 198 supported thereon in an upward position. The heel clamp mount 212 has a heightwise extending slot 232 formed therein for accommodation of the forwardly extending end of the screw 226, the upper limit of movement of the carriage 216 and heel clamp 198, being determined by engagement of the screw 226 with the upper end of the slot 232, as shown in FIGURE 8. At about the same time as the toe post 22 and shoe assembly supported thereon complete their rise, the motor 204 is actuated to cause the heel clamp 198 to move rearwardly, engaging the shoe assembly just after termination of the rise thereof, thus further rigidifying the shoe assembly in preparation for subsequent shoe manufacturing operations, and more particularly the wiping operation.

Figure 20:
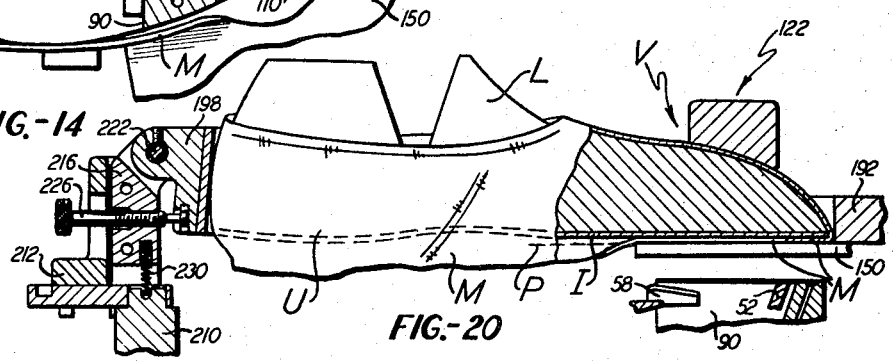
FIGURE 20 is a side elevation, partly in section, of the shoe assembly and illustrating the position to which the shoe assembly tends to pitch upon retraction of the insole rest assembly.

As more fully disclosed in the aforesaid U.S. applications, as the toe post 22 rises to bring the shoe assembly through the yoke 192 and to a proper level with respect to the wipers 150, the toe pincers 100 are caused to release the toe end of the upper margin M, and be moved downwardly away from the shoe assembly, so as not to mechanically interfere with the bottom surface of the wipers 150. As the toe post 22 nears completion of its rise, the side pincers 98 are caused to release their gripping of the upper margin in a sequence fully described in the aforementioned U.S. applications, and the retarders 108 and 110 are forced upwardly against the upper margin M to press the upper margin against the wiper bottoms thereby aiding and maintaining the upper in its pulled-over condition (see FIGURE 12). It should be noted that during the rise of the shoe assembly, the pressure of the retarders 108 and 110 against the wiper bottoms must be sufficiently light as to enable the upper margin M to slip, to some extent, between the retarders and the wiper bottoms so that the upper U will not be damaged or torn. At the completion of the rise of the shoe assembly, the retarders are pressed against the wiper bottoms with a greater force to hold the upper margin more firmly against the wiper bottoms for the subsequent wiping operation. When the sequence of operation has reached the stage where the wipers 150 are to be actuated, it may be seen that the shoe assembly is rigidly clamped in position by means of cooperation of the heel clamp 198, the insole rest assembly 28, and the toe hold-down 122, with the upper U being maintained in its pulled-over condition by means of cooperation of the yoke 192, bumpers 196 and the pressing of the upper margin M between the retarders 108 and 110 and the bottom surface of the wipers 150. The control circuit of the machine then causes actuation of the motor 158 to effect a wiping stroke of the wipers 150. As the wipers 150 move through their wiping stroke along the horizontal wiping plane P, the upper margin M is engaged by the forwardly diverging edges 152 of the wipers 150, and is caused to be folded under and against the bottom of the insole. It should be noted that the insole rest assembly 28 had been adjusted so as to support the shoe assembly in a rearwardly pitched attitude, such that the forepart of the insole bottom is inclined with respect to the wiping plane P with the toe of the shoe pointing towards the wiping plane P (see FIG. 17). The effect of such disposition of the shoe assembly insures that as the wipers 150 are actuated, the extreme portion of the shoe assembly will be fully and properly wiped. The more heelward portions of the upper margin M are wiped to the margin of the forepart of the insole under a progressively lesser force than that with which the toe end of the shoe assembly is wiped, this being due to the inclination of the shoe assembly and the increasing heightwise distance between the bottom of the insole and the upper wiping surface 156 of the wipers 150. During the wiping stroke, the adhesive applicator 90, which had previously been effective to apply adhesive to the bottom of the insole I, is first lowered out of the path of movement of the oncoming wipers 150. After this, the pressures applied by the retarders 108 and 110 forcing the upper margin M against the wiper bottoms are relieved, the timing being such that this takes place after the wipers 150 have crossed under the insole I and have started to wipe the upper margin M to the insole, so that the stretching of upper U about the last that had been maintained by the retarders is taken over by the wipers 150, with the result that the stretching of the upper about the last is maintained throughout the wiping stroke. This is aided by the fact that the yoke 192 and bumpers 196 are being pressed against the shoe assembly under relatively high pressure. As the wipers 150 further close about the bottom of the shoe assembly, the insole rest assembly 28 is caused to be lowered out of the path of the oncoming wipers 150 so as to preclude mechanical interference therebetween. When the insole rest assembly 28 is so lowered, the shoe assembly is supported on its bottom solely by the upper surface 156 of the wipers 150, thus enabling the hold-down 122 to press the shoe assembly downwardly directly against the wipers 150 and provide an overwiping pressure. It is during this time in the operation of the machine that the shoe assembly may tend to pitch forwardly, thus causing the heel end of the shoe assembly to have a downwardly directed movement. The downward pitching of the shoe assembly is caused by the fact that when the support is retracted, the shoe is supported at the toe and the force of the hold-down imparts a movement to the shoe assembly in a counterclockwise direction as seen in FIGURES 12 and 20. Thus, when the insole rest assembly 28 is retracted, the shoe assembly is supported primarily at the toe end thereof and the downwardly directed force of the hold-down 122 tends to cause the shoe assembly to pitch forwardly. The forward pitch of the shoe assembly will terminate when the forepart of the insole is in substantially flush engagement with the upper surface 156 of the wipers 150, and is in the wiping plane P as shown in FIGURE 20. It should be noted that toward the end of the wiping stroke the hold-down 122 is caused to be forced downwardly under relatively heavy pressure for a predetermined length of time to iron the wiped upper margin against the insole and to enable the adhesive that had been extruded between the wiped upper margin M and insole I to firmly bond to the upper margin to the insole.

The heel clamp 198 is maintained in its rearward, heel engaging position throughout the wiping stroke, so as to preclude forward movement of the shoe in response to the forwardly directed component of movement of the wipers 150. The mounting of the heel clamp 198, so as to enable it to move yieldably downwardly, is of particular utility during that time in the wiping stroke, when the insole rest assembly is retracted, and the shoe assembly pitches forwardly, with the heel end of the shoe tending to move downwardly. The freedom of movement of the heel clamp 198 enables it to move downwardly with and in response to the downward movement of the heel end of the shoe, while precluding forward movement of the shoe assembly. In this manner, it is insured that the heel end of the shoe upper will not be marred as a result of the tendency of the shoe to pitch. When the shoe assembly is removed from the machine, the spring 230 causes the carriage 216 and heel clamp 198 to return to their upward, idle position.

I claim:

1. A machine for performing shoe manufacturing operations on a shoe assembly which includes a last having an insole located at the bottom thereof, and a shoe upper draped about one end of said last, in such a manner that a marginal portion thereof extends beyond the bottom of said insole comprising:

wiping means having a planar wiping surface formed thereon in a wiping plane;

means for supporting said shoe assembly in a predetermined position, such that the plane of the insole at the bottom of said end, is pitched with respect to said wiping plane, the extremity of said end of said shoe assembly being the position thereof most proximate to said wiping plane, with the bottom of said insole at said extremity, being spaced from said wiping plane a distance no greater than the thickness of said upper margin, said margin being disposed in intersecting relation to said wiping plane;

hold-down means;

means mounting said hold-down means for movement between a remote position and a working position, wherein said hold-down is in engagement with the top of said one end of said shoe assembly so as to urge said shoe assembly downwardly against said shoe assembly supporting means;

means mounting said wiping means for planar movement in said wiping plane, said wiping means having a component of movement that is lengthwise of and towards the other end of said shoe assembly such that said wiping surface may engage the marginal portion of said upper to fold and wipe said upper margin to the margin of said insole, said pitched disposition of said shoe assembly being effective to enable said wiping surface to most effectively wipe said upper margin to said insole at said extremity of said one end of said shoe assembly;

means mounting said shoe assembly support means for retraction from its supportive position of said shoe assembly subsequent to the initiation of said wiping of said upper margin to said insole by said wiping means thereby transferring support of said shoe assembly from said shoe assembly supporting means, to said planar wiping surface of said wiping means, said inclined attitude of said shoe assembly tending to cause said shoe assembly to pitch on said planar wiping surface, to a non-inclined attitude, wherein the plane of said insole at said one end of said shoe assembly, is in substantially flush engagement with said wiping surface, said pitching of said shoe assembly being in response to cooperative retraction of said support means, and the downwardly directed urging of said hold-down means, said pitching of said shoe assembly tending to cause downward movement of said other end of said shoe assembly;

an end clamp;

means mounting said end clamp to said machine for movement between a position that is remote from said shoe assembly when said shoe assembly is in said predetermined position and a working position wherein said end clamp is in engagement with said other end of said shoe assembly so as to preclude lengthwise movement of said shoe assembly in response to said movement of said wiping means;

drive means for effecting said movement of said end clamp between said remote and said working position thereof; and means mounting said end clamp for further movement that is yieldably downward of said shoe assembly when said shoe assembly is in said predetermined position whereby said downward pitching of said other end of said shoe assembly may not be retarded by means of the engagement of said end clamp with said shoe assembly.

2. A machine for performing shoe manufacturing operations on a shoe assembly which includes a last having an insole located at the bottom thereof and a shoe upper draped about one end of said last on such a manner that a marginal portion thereof extends beyond the bottom of said insole comprising:

wiping means having a planar wiping surface formed thereon in a wiping plane;

means for supporting said shoe assembly in a predetermined position such that the plane of the insole at the bottom of said end is pitched with respect to said wiping plane, the extremity of said end of said shoe assembly being the portion thereof that is most proximate to said wiping plane, the bottom of said insole at said extremity being spaced from said wiping plane a distance no greater than the thickness of said upper margin, said upper margin being disposed in intersecting relation to said wiping plane;

means mounting said wiping means for planar movement in said wiping plane, said wiping means having a component of movement that is lengthwise of and towards the other end of said shoe assembly such that said wiping surface may engage the marginal portion of said upper to fold and wipe said upper margin to the margin of said insole, said pitched disposition of said shoe assembly being effective to enable said wiping surface to most effectively wipe said upper margin to said insole at said extremity of said one end of said shoe assembly;

means so constructing said shoe assembly support means as to cause said shoe assembly support means to discontinue its support of said shoe assembly subsequent to the initiation of and during said wiping of said upper margin to said insole by said wiping means, thereby transferring support and said shoe assembly from said shoe assembly supporting means to said planar wiping surface of said wiping means;

hold-down means;

means mounting said hold-down to said machine for movement between a remote position and a working position wherein said hold-down is in engagement with the top of said one end of said shoe assembly so as to urge said shoe assembly downwardly towards said wiping surface, said inclined attitude of said shoe assembly tending to cause said shoe assembly to pitch on said planar wiping surface to a non-inclined attitude wherein the plane of said insole at said one end of said shoe assembly is in substantially flush engagement with said wiping surface, said pitching of said shoe assembly being in response to the cooperation of the removal of said shoe assembly support means, and the downwardly directed urging of said hold-down means, said pitching of said shoe assembly tending to cause downward heightwise movement of said other end of said shoe assembly;

an end clamp;

means mounting said end clamp to said machine for movement between a position that is remote from said shoe assembly when said shoe assembly is in said predetermined position, and a working position, wherein said end clamp is in engagement with said other end of said shoe assembly in response to said movement of said wiping means;

drive means for effecting said movement of said end clamp between said remote and said working positions thereof; and means mounting said end clamp for further movement that is yieldably downward of said shoe assembly when said shoe assembly is in said predetermined position whereby said downward pitching of said other end of said shoe assembly may not be retarded by means of the engagement of said end clamp with said shoe assembly.

3. A machine for performing shoe manufacturing operations on a shoe assembly which includes a last having an insole located at the bottom thereof, and a shoe upper draped about one end of said last, in such a manner, that a marginal portion thereof, extends beyond the bottom of said insole comprising:

wiping means having a wiping surface formed at the upper portion thereof;

means for supporting said shoe assembly with respect to a wiping plane, and in a predetermined position such that the plane of the insole at the bottom of said end is pitched with respect to said wiping plane, the extremity of said end of said shoe assembly being the portion thereof that is most proximate to said wiping plane, the bottom of said insole at said extremity being spaced from said wiping plane a distance no greater than the thickness of said upper margin, said margin being disposed in intersecting relation to said wiping plane, said shoe assembly supporting means being normally disposed above the level of said wiping surface of said wiping means;

means mounting said wiping means for movement, such that said wiping surface thereof may move along said wiping plane, and having a component of motion that is lengthwise of and towards the other end of said shoe assembly, such that said wiping surface may engage the marginal portion of said upper to fold and wipe said upper margin to the margin of said insole, said pitched disposition of said shoe assembly being effective to enable said wiping surface to most effectively wipe said upper margin to said insole at said extremity of said one end of said shoe assembly;

means mounting said shoe assembly support means for downward movement below the level of said wiping plane, so as to cause said shoe assembly support means to discontinue its support of said shoe assembly, subsequent to the initiation of enduring said wiping of said upper margin to said insole by said wiping means, thereby transferring support of said shoe assembly from said shoe assembly supporting means, to said wiping surface of said wiping means;

hold-down means;

means mounting said hold-down means to said machine for movement between a remote position and a working position, wherein said hold-down is in engagement with the top of said one end of said shoe assembly, so as to urge said shoe assembly downwardly towards said wiping surface, said inclined attitude of said shoe assembly tending to cause said shoe assembly to pitch on said wiping surface to a non-inclined attitude, wherein the plane of said insole at said one end of said shoe assembly is in substantially flush engagement with said wiping surface, said pitching of said shoe assembly being in response to the cooperation of the downward retraction of said shoe assembly support means and the downwardly directed urging of said hold-down means, said pitching of said shoe assembly tending to cause downward heightwise movement of said other end of said shoe assembly;

an end clamp;

means mounting said end clamp to said machine, for movement between a position that is remote from said shoe assembly, when said shoe assembly is in said predetermined position, and a working position wherein said end clamp is in engagement with said other end of said shoe assembly, so as to preclude lengthwise movement of said shoe assembly in response to said movement of said wiping means;

drive means for effecting said movement of said end clamp between said remote and said working positions thereof; and means mounting said end clamp for further movement, that is yieldably downward of said shoe assembly when said shoe assembly is in said predetermined position, whereby said downward pitching of said other end of said shoe assembly, may not be retarded by means of the engagement of said end clamp with said shoe assembly.

4. An apparatus as recited in claim 1 wherein said means mounting said end clamp for said downward movement comprises:

a mounting member supported on said means mounting said end clamp for movement between said remote and working positions thereof for movement therewith;

a carriage movably mounted to said mounting member;

guide means for guiding said carriage for heightwise movement on said mounting member; and means mounting said end clamp to said carriage.

5. An apparatus as recited in claim 4 wherein said end clamp mount has an abutting surface disposed at the upper end thereof, said apparatus further comprising:

an abutting member, supported on said carriage, and being in alignment with said abutting surface of said end clamp mount, whereby the extent of heightwise movement of said carriage and said end clamp mounted thereto, may be limited by engagement of said abutting member with said abutting surface.

6. An apparatus as recited in claim 4 wherein said end mount has heightwise extending slots formed therein, and wherein said guide means for guiding said carriage for heightwise movement comprises:

a plurality of rollers, rotatably mounted to said carriage and extending into said slots in said end clamp mount.

7. An apparatus as recited in claim 4, further comprising:
   means biasing said carriage in its uppermost position.

8. A method of fabricating a shoe assembly, said shoe assembly including a last, having an insole located at the bottom thereof, and a shoe upper draped about one end of said last, in such a manner, that a marginal portion thereof, extends beyond the bottom of said insole comprising:
   providing wiping means having a wiping surface moveable in a wiping plane;
   stretching said upper about said last, to cause said upper to conform to the shape of said last;
   supporting said stretched shoe assembly in a predetermined position, such that the plane of said insole at the bottom of said one end thereof, is pitched at an incline, with respect to said wiping plane, in such a manner that said one end of said shoe assembly points towards said wiping plane, the bottom of said insole at the extremity of said one end thereof being spaced from said wiping plane a distance no greater than the thickness of said upper margin, said margin being disposed in intersecting relation to said wiping plane;
   effecting movement of said wiping means to cause said wiping surface thereof to move along said wiping plane in a path having a component of movement directed lengthwise of and towards the other end of said shoe assembly, so as to cause said wiping surface to engage said marginal portion of said upper to fold said margin against the bottom of said insole and effect a pressing of said upper margin to said insole, said folding and pressing being most effective at said extremity of said end of said shoe assembly due to its proximity to said wiping plane;
   after said wiping surface has begun to press said upper margin to said insole, whereupon said shoe assembly may be supported entirely by said wiping surface of said wiping means;
   applying a pressing force to the top of said one end of said shoe assembly, so as to urge said shoe assembly downwardly towards said wiping surface, thus enabling said wiping means to press said upper margin to said insole,
   said inclined attitude of said shoe assembly, tending to cause said shoe assembly to pitch on said wiping surface to a non-inclined attitude, wherein the plane of said one end of said insole, is in substantially flush engagement with said wiping surface, the pitching of said shoe assembly being in response to cooperation of removal of said support from said shoe assembly, and said application of said pressing force to the top of said shoe assembly; and
   applying a restraining force to said other end of said shoe assembly, prior to engagement of said wiping means with said shoe assembly, said restraining force being so directed, as to preclude lengthwise movement of said shoe assembly in response to said component of movement of said wiping means, but to enable said other end of said shoe assembly to freely move heightwise, when said shoe assembly is caused to pitch.

References Cited
UNITED STATES PATENTS

| | | | |
|---|---|---|---|
| 2,214,043 | 9/1940 | Clarke | 12—14.4 X |
| 2,299,800 | 10/1942 | Courchene et al. | 12—14.4 X |
| 3,178,743 | 4/1965 | Kamborian | 12—14.4 |
| 3,228,047 | 1/1966 | Schwabe | 12—12.4 |

PATRICK D. LAWSON, *Primary Examiner.*

U.S. Cl. X.R.

12—14.4